Figure 1:
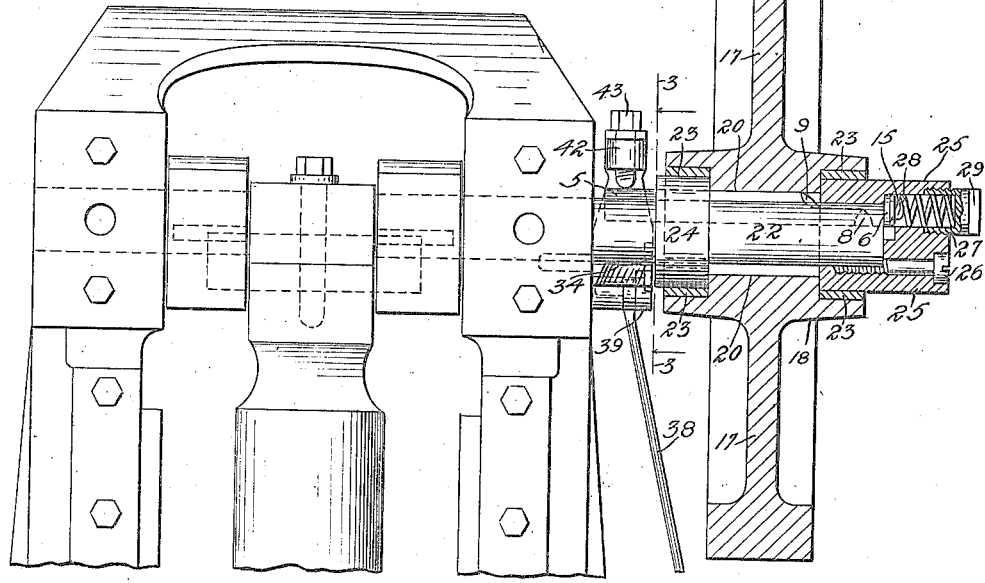

L. J. CAMPBELL.
OPERATING DEVICE FOR PUNCH PRESS CLUTCHES.
APPLICATION FILED NOV. 29, 1912.

1,158,370.

Patented Oct. 26, 1915.
6 SHEETS—SHEET 1.

WITNESSES
Paul A. Viersen.
A. H. Armour

INVENTOR
Leon J. Campbell
BY Armour Hothett ATTY.

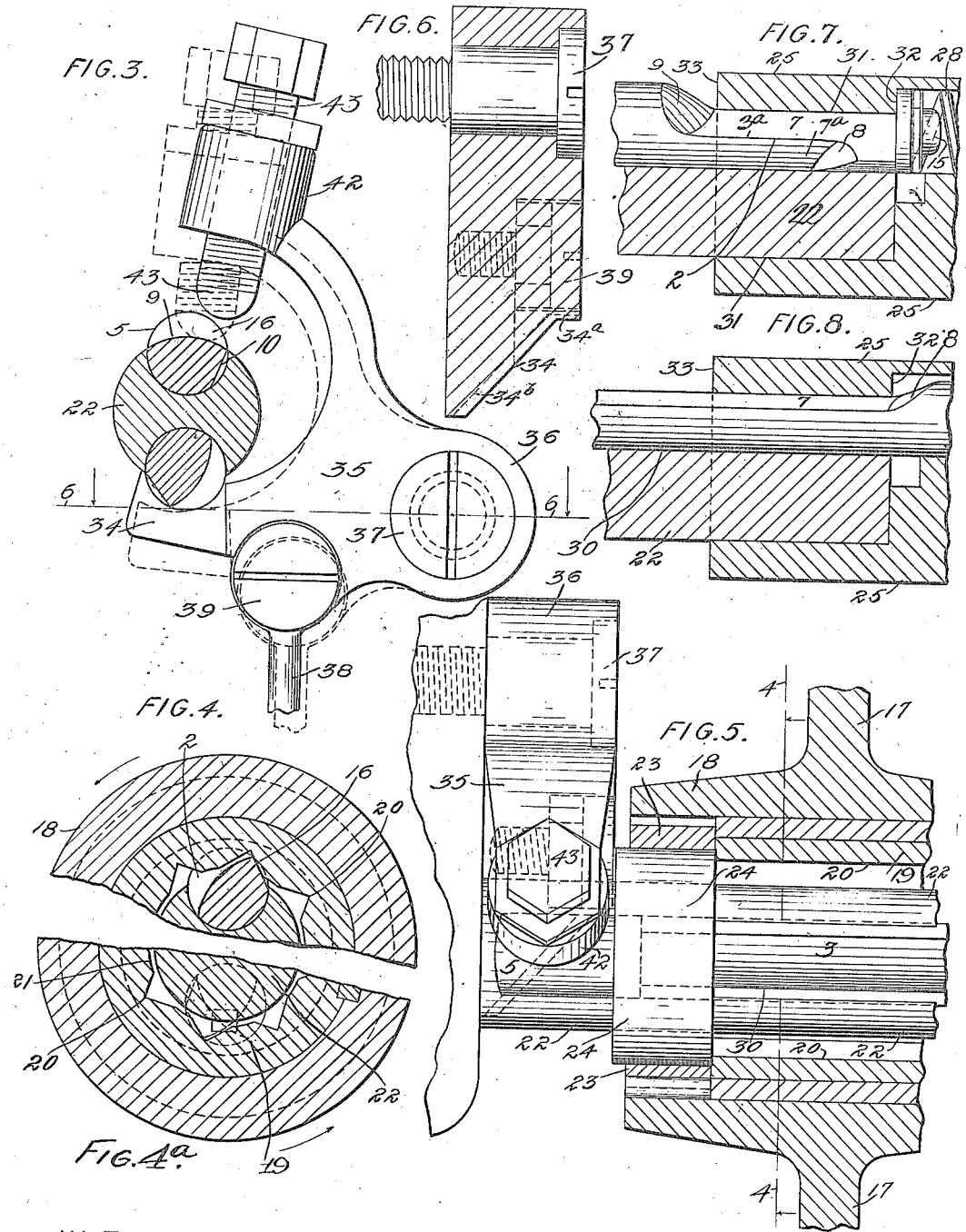

L. J. CAMPBELL.
OPERATING DEVICE FOR PUNCH PRESS CLUTCHES.
APPLICATION FILED NOV. 29, 1912.
1,158,370.
Patented Oct. 26, 1915.
6 SHEETS—SHEET 3.
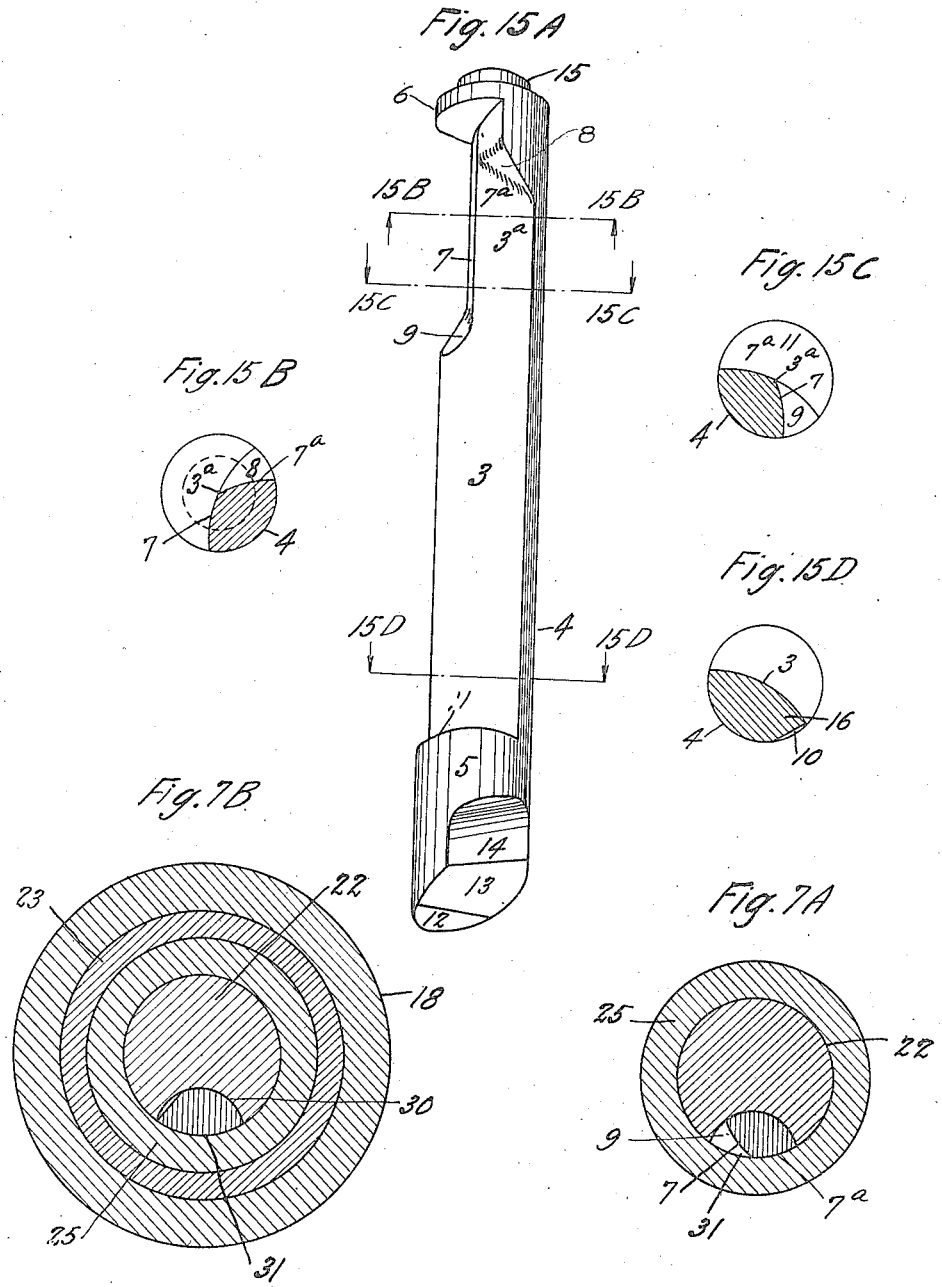

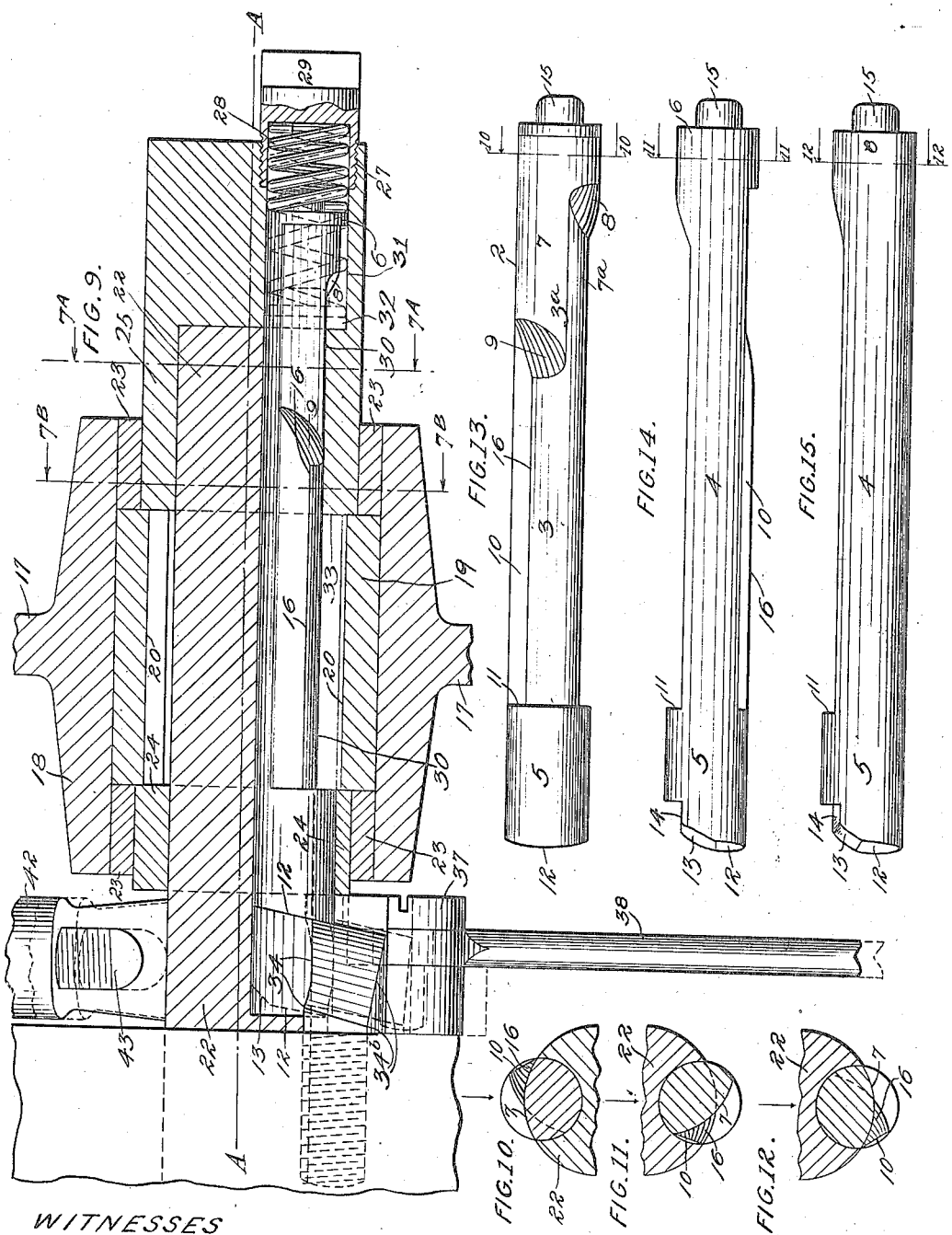

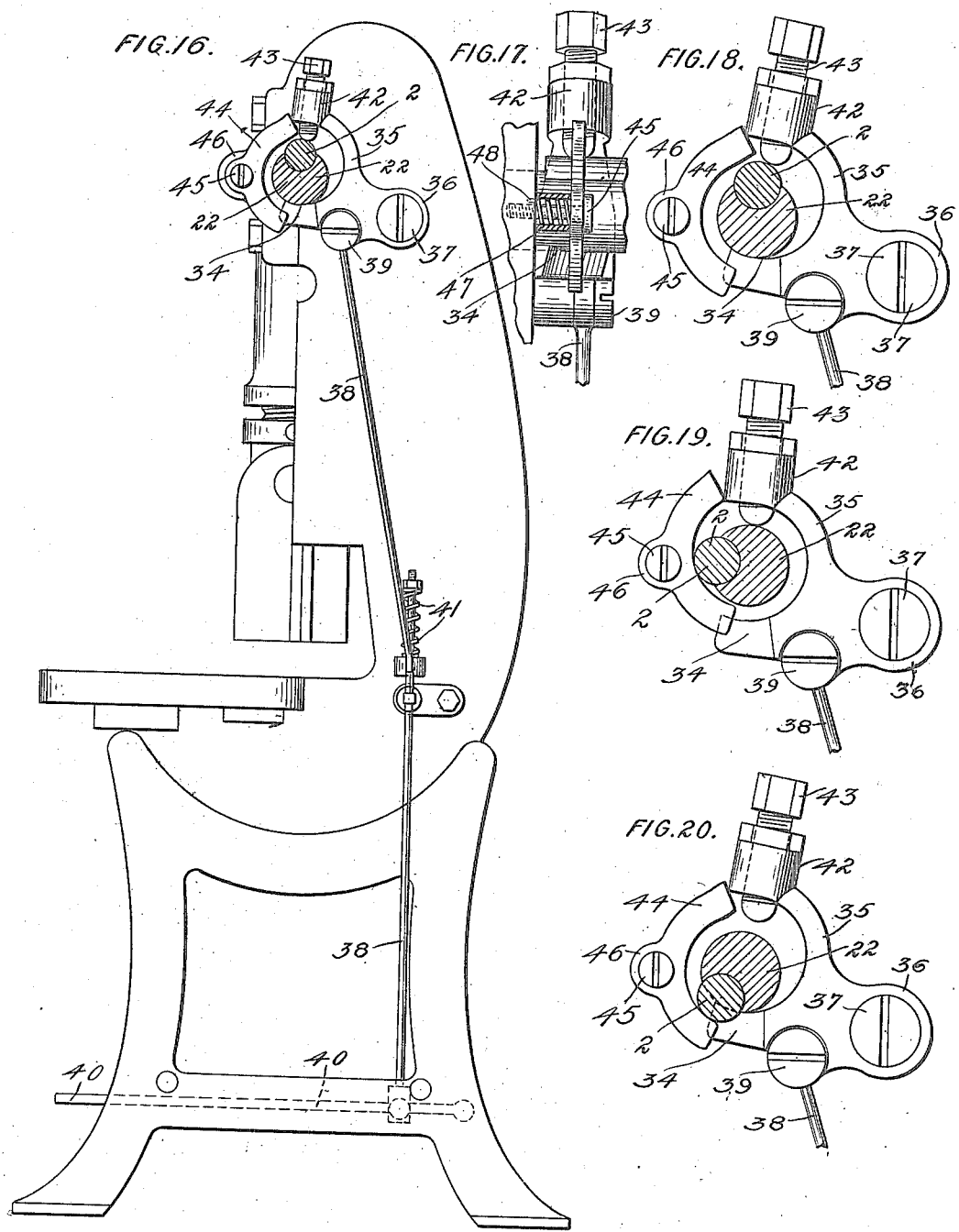

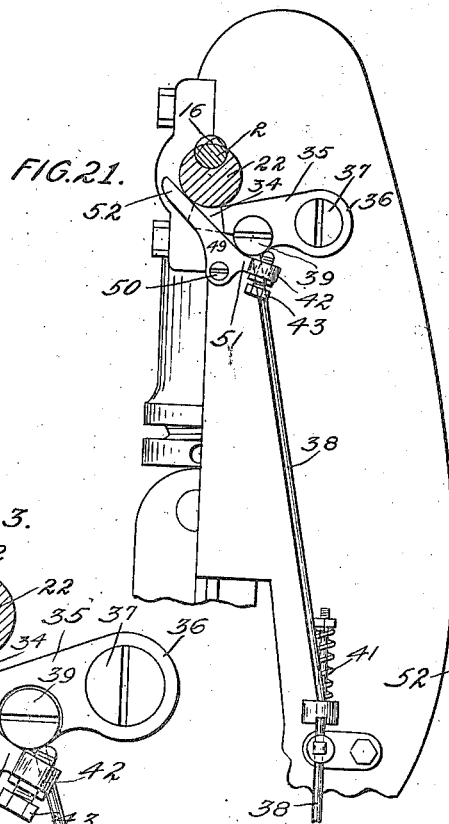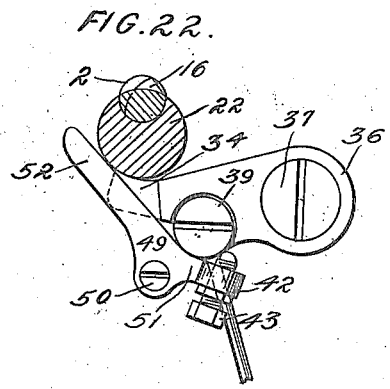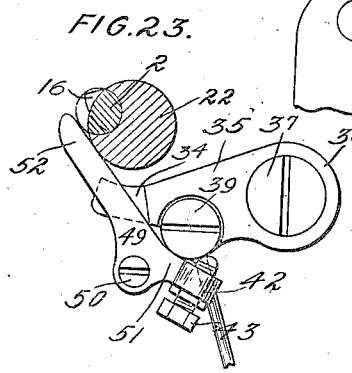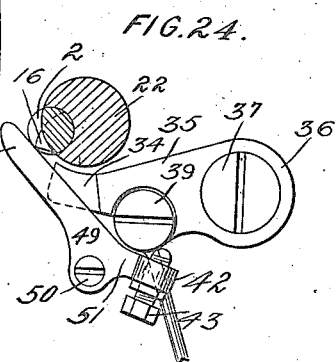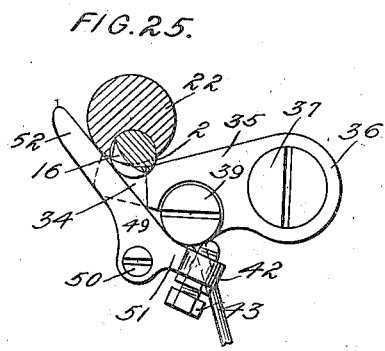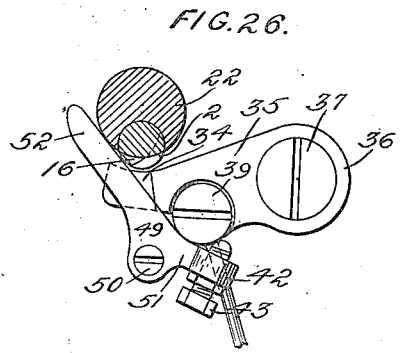

UNITED STATES PATENT OFFICE.

LEON J. CAMPBELL, OF CHICAGO, ILLINOIS.

OPERATING DEVICE FOR PUNCH-PRESS CLUTCHES.

1,158,370.

Specification of Letters Patent. Patented Oct. 26, 1915.

Application filed November 29, 1912. Serial No. 734,110.

*To all whom it may concern:*

Be it known that I, LEON J. CAMPBELL, a citizen of the United States, residing at Chicago, in the county of Cook and State of Illinois, have invented new and useful Improvements in Operating Devices for Punch-Press Clutches, of which the following is a specification.

My invention relates to means for very quickly connecting the mechanism of a punch press with a driving mechanism and for automatically disconnecting it therefrom, and more particularly, to a device for controlling said connecting means—commonly called a "clutch"—to regulate its operation of connecting and disconnecting the punch press shaft with and from the driving means. The clutch, in this case, is a key adapted to tilt about its longitudinal axis, whereby it protrudes a rib or tooth beyond the surface of the operating shaft of the press, in one position, thereby locking the shaft to the driving pulley, while, in another position of being tilted, the rib is turned down or in toward the shaft, the face of the key is turned out, forming a continuation of the surface of the shaft, and the driving pulley rides idle over the shaft and the therein embedded key or clutch. The clutch is tilted by two cams provided on its surface, and brought into action when the clutch is moved lengthwise, causing one or the other cam to strike against the respective end of a collar engaging the clutch between the two cams, which tilt the key in opposite directions. On the inside of the hub of the driving pulley the entire periphery is divided into as many pockets or key-seats as possible, there being a short flat portion or rib between each pair of adjacent, trough-like, key-seats. This reduces to a minimum the amount by which the pulley must advance before being clutched, after the key has been thrown to the locking position. The sloping sides of each key-seat, coöperating with the shape of the sides of the locking-rib or tooth—one of which is curved very slightly, while the other, which is the driving face of the key, is flat, and both converge to form the ridge of the rib—enable the clutch to be tilted out of or into engagement at any practically utilizable speed of revolution of the shaft.

The accurate fit of the locking-rib in its key-seat, and the short distance between successive key-seats combine to make this clutch available in punch presses running at very high speeds; prevent the shearing off of gear-teeth, common with geared punch presses when the back-lash between the clutch and the driving mechanism exceeds the back-lash between the gears of the press; enable the friction devices, without which such presses are inoperative, to be wholly dispensed with; prevent the clutch from being pounded to pieces by being insufficiently inserted in the locking position, and safeguard the mechanism of the press against internal injury to the parts in case of a suddenly varying load or resistance, as in the case of presses operating drawing-dies or bumper-dies.

The especial object of the present invention is to provide a device which will cause the clutch to lock the shaft positively immediately after it has been released by depressing a pedal, will allow the plunger to make one operative or punching stroke, and then positively lock it at the end of the return stroke.

Another object is to arrange this controlling device so that it may be set to allow the press to continue punching without being started for each stroke.

A further object of the invention is to provide a safety device whereby the operating device will positively be locked at the end of the return stroke even though the operator has not released the pedal in time or has accidentally depressed the pedal a second time before the crank has returned to its dead center, where the clutch is released.

Finally, the invention aims to provide an alternative or substitute safety appliance which will insure the locking of the press despite defective operation on the part of the attendant, as did the safety device just mentioned, but will do this in a different way, and at the same time, will provide means for allowing the press to be set to run continuously, permitting doing away with the upper branch of the dog.

Figure 2:
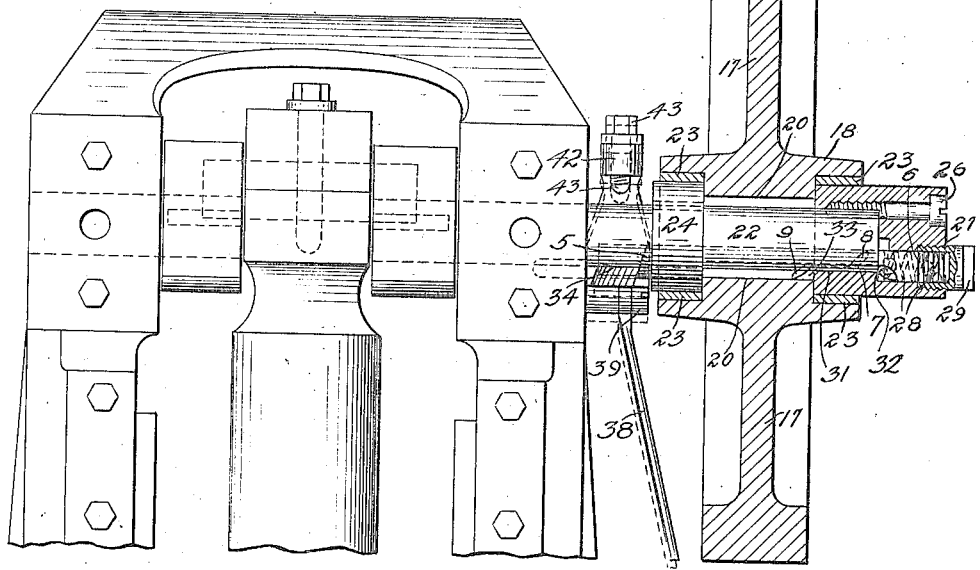

These objects are attained by the mechanism hereinafter described and claimed, and illustrated in the accompanying drawings, in which:

Figure 1 shows in front elevation the upper part of a punch press in the act of delivering its punch, the crank being at the end of its downward stroke. The controlling dog and the inner bearing collar of the driving pulley are also shown in front elevation, while the driving pulley, its outer bearing collar or muff, and parts of the clutch mechanism are seen in vertical section, the key being in the locking position. Fig. 2 is a like drawing of the same parts, the crank being just about to start on its down stroke, and the key in the position of release, its spring compressed, ready to throw the key forward, i. e. inward toward the press, so that it will be tilted to lock the pulley to the shaft before the down stroke has become fairly started. The spring is shown in dotted lines as extended after having thrown the clutch to lock. Fig. 3 is a side elevation of the controlling dog and connections, showing the dog in full lines in the upper position corresponding to Fig. 2, the wedge-shaped cam holding the clutch outward, preventing its being thrown forward to lock; while the dotted lines represent the dog pulled down by the trip rod, carrying the wedge-cam clear of the end of the clutch, so that the key has been shot inward and engaged the drive pulley. Figs. 4 and 4ª are each a partial transverse, vertical section through the hub of the drive-pulley, on line 4—4 of Fig. 5. In Fig. 4 the locking-rib is shown engaging the keyseat in the drive-pulley; and Fig. 5 shows the rib turned inward to the release position. Fig. 5 is a top plan view of the controlling dog, a fragment of the side standard or frame of the press, the clutch in its locking position, a portion of the driving shaft of the press, and its inner bearing collar; and a horizontal section through the center of the hub and the drive-pulley, the outer portions being broken away. Fig. 6 is a horizontal section on line 6—6 of Fig. 3, showing pivot-bolt and trip-rod bolt of the controlling dog, and the wedge-cam. Fig. 7 is a vertical section of the outer part of the housing of the clutch, showing the tilting collar, and the outer part of the key in the locking position. Fig. 8 is a like view showing the key released. Figs. 7ᴬ and 7ᴮ are sections taken respectively on lines 7ᴬ—7ᴬ and 7ᴮ—7ᴮ of Fig. 9 in the direction of the arrows. Fig. 9 is an enlarged detail view showing a front elevation of the controlling dog, of part of the frame of the press, and the upper part of the trip-rod; and representing in vertical section a portion of the drive-pulley, the bearing collars or rings, and the housing for the clutch and the clutch-actuating spring. Fig. 10 is a vertical, transverse section of the key and part of the drive-shaft, the key being in the locking position. Fig. 11 is a like view to the one immediately preceding, the key being in the release position. Fig. 12 is a view similar to Figs. 10 and 11, showing the key as again engaging the drive-pulley, but this time carried to the lowest part of its travel by the revolution of the shaft. Figs. 13, 14, and 15 are top plan views of the key or clutch in the positions corresponding respectively to Figs. 10, 11, and 12, the arrows in the latter three figures showing the direction in which views 13, 14 and 15 were taken. Fig. 15ᴬ is a perspective view of the tilting key and Figs. 15ᴮ, 15ᶜ and 15ᴰ show transverse sections through the key taken respectively on lines 15ᴮ—15ᴮ; 15ᶜ—15ᶜ and 15ᴰ—15ᴰ, of Fig. 15ᴬ. Fig. 16 is a side elevation of a punch press the frame of which is somewhat smaller than that of the one shown partly in Figs. 1 and 2, illustrating the application to the press, of the controlling dog, the trip mechanism and the safety claw. The clutch and shaft are shown in vertical, transverse section, the key is engaged and has just thrown the wedge-cam upward. Fig. 17 is a front elevation partly in section, showing the dog as it has just been thrown back to the upper position by the passing of the key thereunder, the top of the claw engaging the lower, forward end of the boss on the upper branch of the controlling dog. Fig. 18 is a side elevation of the parts in the position described under Fig. 17. Fig. 19 is a side elevation of the same parts—shaft and clutch being shown in section, with the key in the locking position—the dog having inadvertently been tripped a second time, so that, unless restored to the engaging position before the crank reaches the end of the return stroke, the key will remain locked, and the press will complete another revolution. The key is seen engaging the lower branch of the safety claw, pressing the tip of the upper branch against the top of the controlling dog, whereby the latter will be pushed back to its upper position. Fig. 20 is a like view of the same parts as shown in Figs. 18 and 19, representing the safety claw as having returned the dog to its operative position, the key not yet having reached the bottom of its path. Fig. 21 is a side elevation of the upper part of a punch press equipped with my improved clutch, the clutch-controlling dog, and a safety spur, the clutch and other parts being in the position corresponding to Figs. 1, 3, 5, 7, 10, 13, and 16, but the safety claw being left out, as its place is taken by the safety spur. Fig. 22 is an enlarged detail of the operative parts in the position they occupy in Fig. 21. Fig. 23 is a side elevation of the operative parts shown in Fig. 22, showing that the lever has been pushed down by mistake before the punch has reached the bottom of its stroke, whereby the wedge-cam has been pulled down away from the shaft and the cocking position. The key is seen to be just striking the tip of the safety spur. In Fig. 24 the key is fully engaging the safety spur and has commenced swinging the rear part of the spur upward, returning the wedge-cam to its cocking position, but the latter has not yet been reached. Fig. 25 shows the key as having swung the safety spur so as to fully return the wedge-cam to its cocking position with its upper edge hard up against the bottom of the drive-shaft. Fig. 26 shows the same operative parts after the wedge-cam has been drawn down, the clutch allowed to jump inward to the locking position, and the spur is ready to be actuated by the key in its next revolution to restore the wedge to its cocking position.

Referring to Figs. 13, 14, 15, 15$^A$, 15$^B$, 15$^C$, 15$^D$, 7$^A$ and 7$^B$, the clutch or tilting key 2 is a short bolt of a general cylindrical shape, having its full diameter only for a short distance at each end, although throughout the length of the key the back 4 is curved to a radius equal to one half that diameter. The face 3 on the side of the key opposite to said back, is cut down to the curvature of the radius of the driving shaft, extending between the short shoulder 6 at the outer end of the key and the full-bodied nose 5 at its inner end. Looking inwardly along the key, toward the punch press proper, the outer portion of the "face" 3 is divided by the ridge 3$^a$ into two surfaces 7 and 7$^a$ of equal width and of the same radius of curvature. Surface 7 slopes down to the right hand from ridge 3$^a$, extending outward to the inner face of shoulder 6, and being connected with the face 3 by a short cam-surface 9. Surface 7$^a$ is a continuation of face 3 which slopes up to the outer, full-faced portion of surface 7 in a short cam-surface 8. Thus ridge 3$^a$ is the intersection of the curved surfaces 3 and 7$^a$ on the right hand side of which the cam 8 leads up from surface 3 to surface 7 and on the left hand side of which the cam 9 leads up from surface 7 to surface 3. From the knuckle of cam 9 inward to shoulder 11, at the outer end of full-bodied portion 5 the key has a flattened bearing face or fin 10. The nose 5 terminates at its inner end in a short face 12 which has two inclinations, sloping outwardly from its top downward (the key being considered as lying on its back with its face 3 turned up) and again, outwardly from right to left. At its left hand edge face 12 runs off in the short face 13 in which the two inclinations of face 12 are retained, only in a more marked degree, especially the slope outward from right to left. Adjacent the edge of face 13 is a short portion 14 approximately parallel to the axis of the key and running in a curved fillet into the full-bodied portion 5. A short, cylindrical lug 15 projects outwardly from the center of shoulder 6. It will be seen that face 3 of the key and the flat bearing-face 10 form the two sides of a longitudinal rib 16 (Figs. 3, 4, 10, 11, 12 and others). It is this rib 16 that receives on its face 10 the driving impulse of the pulley 17.

The hub 18 of the pulley has secured within its bore by keys or other suitable means a sleeve 19, the interior surface of which is divided into 8 key-seats or pockets 20, of triangular section. The punch press, of any known type, has its driving shaft 22 driven by a belt-pulley 18 in the present incorporation of the invention illustrated in the accompanying drawings, but the invention is applicable to any other means of drive, such as by gearing or by direct connection. Adjacent each end of the sleeve 19 a short brass or gun metal bushing 23 is shrunk or pinned inside of the axial bore of the hub 18. These two bearing-bushings 23 ride on steel collars 24, 25 of equal outside diameter, which is such that the intermediate surfaces 21 between the key-seats 20 will swing well clear of the surface of the driving shaft. The interior collar 24 is shrunk or otherwise secured to the shaft 22, while the outer collar 25 is integral with a hollow cap secured to the end of the shaft by a machine screw 26, and contains housing or chamber 27, for a spiral spring 28 bearing against shoulder 6 of the key, and held in position by the lug 15, the outer end of the spring chamber being closed by a hollow, screwed plug 29.

The key travels back and forth for a short distance along the driving shaft in a longitudinal groove or trough 30, of a semi-circular section, the radius of which is equal to that of the full-bodied portion 5, and the shoulder 6 of the key. This groove is preferably cut about 180 degrees apart from the crank of the punch press. The outer portion of the key from a point approximately one-quarter of an inch inside of the interior end of tilting-cam 9, to the shoulder 6, travels with its inner part, radially considered, in said groove 30, and its outer part in the chamber 27, which is of cylindrical figure having its diameter slightly greater than the diameter of the full-bodied portions 5 and 6 of the tilting key and its axis parallel to the axis of the driving shaft. The axis of chamber 27 is spaced radially outside of the axis of the driving shaft by an amount such that when the key 2 lies in said chamber 27 with its back 4 toward the axis of the driving shaft its face 3 will bear against the inner surface (radially considered) of the bore 31 cut in the inner end of cap 25 co-axially with and of the same diameter as said driving shaft. It will be noted that as the cap 25 fits over the outer end of the driving shaft a portion of the bore 31 will form the outer (radially considered) wall of a channel the inner wall of which will be formed by groove 30 in the driving shaft and will hence be of the diameter of the full-bodied portions of the tilting key, so that any cross section of said channel would be represented by the cross hatched part of Fig. 15$^D$. Hence there will be formed at each end of said channel a shoulder 32, 33 adapted to engage cam surfaces 8 and 9 respectively and to coact with them to tilt the key (see Figs. 7, 8, 7ᴀ and 7ᴮ). Fig. 7 shows the key at its extreme inward travel, spring 28 distended, pressing shoulder 6 of the key against shoulder 32 of cap 25. When the key is pushed outward, as will be explained farther on, cam 9 very quickly comes into engagement with shoulder 33. Since cam 9 slopes upward to the left longitudinal pressure against its surface must produce a component urging downward or away from face 3. This will cause the key to turn in the direction of the hands of a watch, or downward to the right, whereby the rib or fin 16 is turned out of engagement with key seat 20 of the drive wheel hub, and the key slides outward with its full-faced portion 3 and back 4 completely filling all of cross section of channel under bore 31 excepting the small segment cut off by the flattening of face 10 of rib 16. At the end of its outward travel the key appears as shown in Figs. 8 and 9, with cam 8 just outside of shoulder 32, and spring 28 fully compressed. As soon as the faces 12 and 13 of the key are released, as will be explained, the spring 28 drives the clutch 2 inward. Cam surface 8 instantly comes into engagement with shoulder 32, whereby the key is tilted outward, radially considered, in the contra-clockwise direction, causing it to protrude so as to be engaged by the next arriving key-seat 20 of the continually turning drive-pulley 17.

The locking and disengaging of the key is controlled by a trip rod in connection with wedge-cam 34, machined on the end of the lower branch of a semi-circular dog 35, having a rearwardly extending, integral ear 36, pivoted on a full-bodied screw 37, screwed into the side of the frame of the punch press, to the rear of and slightly below the center of the driving shaft. A trip rod 38 articulated to the lower part of dog 35 by screw 39, is pulled down by depressing a pedal lever 40 (Fig. 16), which, when released, is pulled up to the operating position by a spring 41, operating through the customary, known connections. Wedge-cam 34 is inclined from its forward edge outward to its rear end, where it terminates in a shoulder 34ᵃ, and in addition, the face has a second inclination from its bottom outward to its top, being the obverse counterpart of the second inclination spoken of in connection with face 13 of the key. This second inclination of face 34 is shown in Fig. 6 by the dotted line 34ᵇ, corresponding to the bottom edge of the wedge-cam. The end of the upper branch of dog 35 is formed into an internally threaded boss 42, which carries adjustably a round-pointed screw-bolt 43.

Figs. 1, 3, 7, 10 and 13 show the key in the locking position with rib 16 engaged by one of the key-seats 20. Prior to arriving at the position 2 in said figures, the dog 35 was in the full down position, with the wedge 34 well clear of the bottom of the driving shaft, as indicated in dotted lines in Fig. 3. When the revolution of the shaft brought the full-bodied portion 5 of the key into engagement with the rounded point of screw 43, the latter was pushed upward and backward, swinging the dog on its pivot 37, until the upper edge of the wedge-cam 34 was brought to bear against the bottom of the driving shaft, as shown in said figures. The crank of the punch press is at this time at the end of its downward stroke, and the wedge-cam is lying in the path of the inner end of the key 2, projecting well beyond the inner edge of collar 24. As the crank approaches its upper dead center, the wedge cam is engaged by face 12, which commences to push the key outward; then face 13 swings into engagement with face 34, continuing the outward translation of the key 2. As soon as face 13 is in full engagement with the wedge-cam the two surfaces are locked together by the second inclination above described as inherent to both of them. The oppositely inclined surfaces being thus locked together, cannot be separated by the continuing rotation of the shaft, which is of especial importance to insure perfectly reliable functioning of the automatic key-disengaging device, in high-speed punch presses. As the shaft continues to rotate, the wedge-cam continues forcing the key outward, and as the outer end of cam 9 is under shoulder 33 while the key is in engagement with the pulley 17, the key immediately commences to tilt, which action keeps the inclined face 13 from being turned away from the wedge-cam by the revolution of the shaft. All this time the spring 28 is being compressed toward the outer end of its chamber, the action somewhat resembling the cocking of a firing-pin in a modern small-arm.

After the key has become fully disengaged from the hub it continues to be pushed outward until it has passed for about ¼ of an inch inside the inner end of cam 9, beyond shoulder 33, so as to insure its being held down in its groove 30, preventing any part from working up to where it might be caught by the bearing faces of the revolving hub. After the pulley has become disengaged, the shaft continues to revolve, being pulled onward by the inertia of the moving parts of the press, until the flat portion 14 of the key is brought up against the heel or shoulder 34ᵃ limiting the wedge-cam, by which the shaft is brought to a dead stop (Fig. 9). When the pedal is now depressed, pulling the wedge-cam 34 down and away from in front of the key, the latter is impelled inwardly by its spring 28, is tilted in the act by cam 8 coacting with shoulder 32 and protrudes its locking-rib 16, which is engaged almost instantly by the next-coming key-seat. After the key has been fully tilted to the locking position the spring continues to push it inwardly until shoulder 6 brings up against shoulder 32, so that the end of cam 9 is brought well within shoulder 33 (by about one-quarter of an inch), avoiding all danger of the key's working out of its position. As soon as the wedge-cam has been tripped a skilled operator will release the pedal, which is at once drawn up to the normal position by spring 41.

For some kinds of work, such as stamping ribbons of metal, the press is preferably run continuously. To set the dog for this manner of operating, screw 43 at the upper end of the dog is screwed out until its point is cleared by the key 2 when the wedge-cam is down so far as to be inoperative. In that case the press can be stopped at any time by screwing down bolt 43, or by pushing the trip rod up by hand. If, after the pedal has been released, the operator depresses it again before the punch has reached the end of its down-stroke, or if he fails to remove his foot from the pedal, the wedge-cam will remain out of operation, so that the shaft will carry by the stopping point and cause a second punching stroke to ensue, which may cause damage to the work or to the attendant. To make this impossible and to insure the automatic release of the key at the end of each punching stroke, an approximately circular safety claw 44 is pivoted to the side of the frame of the punch press by a screw-bolt 45, passing through a protuberance 46 extending forward from and integral with the middle body of the claw. The safety claw is mounted forward of the driving shaft 22, with its pivot on the same level with the axis of the shaft, and sufficiently close to it to enable the upper arm or branch to engage the forward surface of boss 42, and the end of the lower branch to play over the outside of the forward end of the wedge-cam 34 (see Figs. 16 to 20 incl.) A short thimble 47 (Fig. 17) inserted between the safety claw and the side of the punch press frame, incloses a spiral spring which encircles the shank of the screw-bolt 45. The inner end 48 of the spring is inserted in a socket in the side of the frame, while the outer end engages the lower branch of the claw, so that the torsional effect of the spring is to urge the upper branch of the claw against the forward face of boss 42 at the upper end of the controlling dog 35, keeping it in constant engagement therewith. Figs. 16, 17, and 18 show the parts in the initial position corresponding to Fig. 1, with the wedge-cam 34 up against the shaft, ready to push the key back out of engagement with the hub 17.

The tip of the upper branch of the claw 44 is bearing against the forward part of boss 42. Immediately after the parts have been in the position of Fig. 18, the dog and wedge-cam have been pulled down by unintentional depressing of the pedal, bringing the operative parts into the position shown in Fig. 19. As soon as the key 2 passes below pivot 45, it pushes the lower branch of the claw down and outward, pressing the upper branch firmly against the upper end of dog 35, thereby causing the latter to swing backward about its pivot 37, which movement brings the upper edge of the wedge-cam back to bear against the under side of the drive-shaft. Hence, when the key has reached the position in which its disengagement should commence (Fig. 20), the wedge-cam is in its operative position. If the operator should keep his foot on the pedal after having tripped the key, the kick of the claw will be sufficiently rapid and strong to force the pedal upward against the foot-pressure.

A modified form of the controlling and safety devices is shown in Figs. 21 to 26 inclusive. Here only the lower branch of the controlling dog 35 is retained, with its pivot 37, wedge-cam 34, and the articulated connection 39 with the upper end of trip rod 38.

A spur 49 is pivoted by screw-bolt 50 to the side of the punch press frame, almost directly under the axis of the driving shaft, and sufficiently close thereto to be at all times in engagement with either the shaft or its locking-key 2. A boss 42 on a rearwardly extending heel 51 of the spur, is threaded to adjustably carry the round-pointed screw-bolt 43, which takes the place of the adjusting screw 43 in the upper branch of the controlling dog of Figs. 16 to 20 inclusive. Figs. 21 and 22 show the parts in the position corresponding to Figs. 1 and 16. The key locked to the shaft is turned up, and the weight of the dog 35 and trip rod 38 with its connections, acting on the heel of the spur, throws its toe 52 up against the bottom of the shaft. Fig. 23 shows the parts after the dog 35 has been pulled down by the trip rod, and after the key 2 has just engaged the bearing surface of the toe 52 of the spur, and is commencing to press the toe downward, thereby lifting the heel 51, and with it the dog and its wedge-cam. In Fig. 24 this action is shown at a later stage of progress. In Fig. 25 the key has passed from the bearing surface of the spur, having completed the returning of the wedge-cam to its operative position; the key has been released and is commencing to be cocked. In Fig. 26 the key has been tripped, has locked the shaft to the hub, and the spur is again in the initial position of Figs. 21 and 22.

When the adjusting screw 43 in the heel of the spur is screwed back so far that the key can ride by without encountering any resistance from the screw, then the spur will not be rocked to turn the dog so as to carry its wedge-cam up to its operative position, in which case the press will continue in operation without being tripped for each punching stroke.

I claim:

1. A punch press clutch mechanism, comprising a driving shaft, a key having a limited movement lengthwise in guiding means on said shaft and a tilting movement about its axis, resilient means operating against the outer end of said key for urging said key in said guiding means toward said punch press; wedging means articulated to the frame of said punch press and controlled by the operator, acting against the inner end of said key to move it outward along said guiding means, a locking rib on said key, a driving pulley having an axial bore normally riding idle on said shaft and around said key, a plurality of key-seats in the walls of said axial bore, means on said shaft for revolubly supporting said driving pulley with said walls of said bore clear of said shaft, means on said key coacting with a stop on said shaft, for so tilting said key when moved lengthwise against said stop as to protrude said locking rib into the path of said key-seats and cause it to be engaged by one of them, means on said key coacting with a second stop on said shaft, for tilting said key when moved in the direction opposite to said first movement, against said second stop, said second tilting being in the angular direction opposite to said first tilting and bringing said key out of engagement with said key-seat.

2. A punch press clutch mechanism, comprising a driving shaft, a key having a limited movement lengthwise in guiding means on said shaft and a tilting movement about its axis, resilient means operating against the outer end of said key for urging said key in said guiding means toward said punch press; wedging means articulated to the frame of said punch press and controlled by the operator, acting against the inner end of said key to move it outward along said guiding means, a locking rib on said key, a driving pulley having an axial bore normally riding idle on said shaft and around said key, a plurality of key-seats in the walls of said axial bore, means on said shaft for revolubly supporting said driving pulley with said walls of said bore clear of said shaft, a plurality of intermediate surfaces separating each pair of adjacent key-seats, said key-seats and said intermediate surfaces completely filling the periphery of said axial bore, and there being as many of said key-seats as the size of said lock rib and the diameter of said bore will permit, means on said key coacting with a stop on said shaft, for so tilting said key when moved lengthwise against said stop as to protrude said locking rib into the path of said key-seats and cause it to be engaged by one of them, means on said key coacting with a second stop on said shaft, for tilting said key when moved in the direction opposite to said first movement, against said second stop, said second tilting being in the angular direction opposite to said first tilting and bringing said key out of engagement with said key-seat.

3. A punch press clutch mechanism comprising a driving shaft, a key having a limited movement parallel to the axis of said shaft in guiding means on said shaft and a tilting movement about its axis, a locking rib on said key, a driving pulley having an axial bore, means on said shaft for revolubly supporting said driving pulley with the walls of said axial bore clear of said shaft, means on said key coacting with one of said supporting means, for so tilting said key when moved lengthwise against said supporting means as to protrude said locking rib into the path of said key-seats and cause it to be engaged by one of them, means on said key coacting with said supporting means for tilting said key when moved in the direction opposite to said first movement, said second tilting being in the angular direction opposite to said first tilting and bringing said key out of engagement with said key-seat, elastic means for urging said key into engagement with one of said key-seats, an inclined face on the inner end of said key, means pivoted to the frame of said punch press adapted to coact with said inclined face to push said key outward against said elastic means, man-operated means for moving said key-pushing means out of the path of said key, automatic means directly connected with said key-pushing means and actuated by the revolution of said key about the axis of said shaft, for returning said key-pushing means into their operative position after they have been pulled out of said position.

4. A punch press clutch mechanism comprising a driving shaft, a key having a limited movement parallel to the axis of said shaft in guiding means on said shaft and a tilting movement about its axis, a locking rib on said key, a driving pulley having an axial bore, means on said shaft for revolubly supporting said driving pulley with the walls of said axial bore clear of said shaft, means on said key coacting with one of said supporting means, for so tilting said key when moved lengthwise against said supporting means as to protrude said locking rib into the path of said key-seats and cause it to be engaged by one of them, means on said key coacting with said supporting means for tilting said key when moved in the direction opposite to said first movement, said second tilting being in the angular direction opposite to said first tilting and bringing said key out of engagement with said key-seat, a face on the inner end of said key, having a principal inclination from the top down, and a second slope from right to left, means pivoted to the side of the frame of said punch press, adapted, when engaged by said inclined face, to push said key outward as it continues to be swung around by the revolving shaft, means controllable by the operator of said punch press, for moving said key-pushing means out of contact with and clear of the path of longitudinal movement of said key, means directly connected and integral with said key-pushing means, and actuated by the revolution of said key about the axis of said shaft to automatically swing said key-pushing means into its operative position opposite the inner end of said key, after it has been pulled out of said position, means for adjusting said automatic means so as to be inoperative, thereby allowing said punch press to work continuously, an inclination on said key-pushing means from the front to the rear, and a second inclination on said key-pushing means from the bottom outward toward the top, said second inclination being adapted to coact with said second slope on said face on the inner end of said key to lock said two inclined faces together after they have entered into mutual engagement, elastic means bearing against the outer end of said key, adapted to be compressed by said outward movement of said key, and to urge said key inward, a safety device pivoted to said frame of said punch press, and engaging a member integral with said key-pushing means, actuated by the swinging of said key by its rotating shaft, to automatically insure the correct operation of said automatic means for swinging said key-pushing means in case the latter have been pulled out of the operative position by inadvertence.

5. A punch press clutch mechanism comprising a driving shaft, a key having a limited movement parallel to the axis of said shaft in guiding means on said shaft and a tilting movement about its axis, a locking rib on said key, a driving pulley having an axial bore, means on said shaft for revolubly supporting said driving pulley with the walls of said axial bore clear of said shaft, means on said key coacting with one of said supporting means, for so tilting said key when moved lengthwise against said supporting means as to protrude said locking rib into the path of said key-seats and cause it to be engaged by one of them, means on said key coacting with said supporting means for tilting said key when moved in the direction opposite to said first movement, said second tilting being in the angular direction opposite to said first tilting and bringing said key out of engagement with said key-seat, a face on the inner end of said key, having a principal inclination from the top down, and a second slope from right to left, means pivoted to the side of the frame of said punch press, adapted, when engaged by said inclined face, to push said key outward as it continues to be swung around by the revolving shaft; means controllable by the operator of said punch press, for moving said key-pushing means out of contact with and clear of the path of longitudinal movement of said key, means directly connected and integral with said key-pushing means, and actuated by the revolution of said key about the axis of said shaft to automatically swing said key-pushing means into its operative position opposite the inner end of said key, after it has been pulled out of said position, means for adjusting said automatic means so as to be inoperative, thereby allowing said punch press to work continuously; an inclination on said key-pushing means from the front to the rear, and a second inclination on said key-pushing means from the bottom outward toward the top, said second inclination being adapted to coact with said second slope on said face on the inner end of said key to lock said two inclined faces together after they have entered into mutual engagement, elastic means bearing against the outer end of said key, adapted to be compressed by said outward movement of said key, and to urge said key inward, a safety device pivoted to said frame of said punch press, and engaging a member integral with said key-pushing means, actuated by the swinging of said key by its rotating shaft, to automatically insure the correct operation of said automatic means for swinging said key-pushing means in case the latter have been pulled out of the operative position by inadvertence, and means for positively holding said key down in its said groove when in the locking and when in the disengaged position, said means operating to continue the lengthwise movement of said key after it has been fully tilted to one or the other of said two positions, thereby inserting said key between said shaft and one or the other of said supporting means on said shaft.

LEON J. CAMPBELL.

Witnesses:
JAMES T. HEALY,
M. H. CAMPBELL.